United States Patent
Morris

Patent Number: 6,119,727
Date of Patent: Sep. 19, 2000

[54] PNEUMATIC SEAT VALVE HAVING A RAPID EXHAUST MODE

[75] Inventor: John M. Morris, Auburn, Wash.

[73] Assignee: GT Development Corporation, Seattle, Wash.

[21] Appl. No.: 09/097,721

[22] Filed: Jun. 16, 1998

[51] Int. Cl.⁷ ........................... F16K 11/065; F16K 35/04
[52] U.S. Cl. ............................... 137/625.25; 137/596.12; 251/297; 297/452.41; 297/DIG. 3
[58] Field of Search ........................... 137/625.25, 596.12; 251/263, 297; 297/284.6, 452.41, DIG. 3

[56] References Cited

U.S. PATENT DOCUMENTS

| | | |
|---|---|---|
| 1,215,071 | 2/1917 | Steedman . |
| 2,792,019 | 5/1957 | Lieser . |
| 2,981,550 | 4/1961 | Machnich . |
| 3,215,386 | 11/1965 | Swenson . |
| 3,218,020 | 11/1965 | Rhodes . |
| 4,264,050 | 4/1981 | Wahls . |
| 4,291,725 | 9/1981 | Raab et al. ........................... 137/625.25 |
| 4,524,951 | 6/1985 | Green et al. ..................... 137/625.25 X |
| 4,597,414 | 7/1986 | Johnson ............................... 137/625.25 |
| 4,733,847 | 3/1988 | Grassl . |
| 4,809,944 | 3/1989 | Smith et al. . |
| 4,954,051 | 9/1990 | Smith et al. . |
| 5,058,852 | 10/1991 | Meier et al. . |
| 5,277,099 | 1/1994 | Powers ............................ 137/625.25 X |
| 5,427,331 | 6/1995 | Stroud . |
| 5,447,178 | 9/1995 | Gabrlik et al. . |
| 5,564,520 | 10/1996 | Forsythe . |
| 5,573,034 | 11/1996 | Gabrlik et al. . |
| 5,590,736 | 1/1997 | Morris et al. . |

FOREIGN PATENT DOCUMENTS

| | | |
|---|---|---|
| 2 328 588 | 5/1977 | France . |
| 3321937 A1 | 1/1984 | Germany . |
| 2 309 894 | 8/1997 | United Kingdom . |

*Primary Examiner*—John Rivell
*Attorney, Agent, or Firm*—Christensen O'Connor Johnson Kindness PLLC

[57] ABSTRACT

A pneumatic valve (10) for use in a pneumatic seat (12) of a vehicle is disclosed. The pneumatic valve includes an upper housing (32) and a lower housing (38). The lower housing is slidably received within the upper housing. The lower housing has an upper surface (78) and a lower surface (79). The lower surface has an inlet stem (88), a seat air inlet/outlet stem (90), and at least a first exhaust port (94). The pneumatic valve also includes an elongate poppet (108) slidably mounted within the seat air inlet/outlet port on a first spring (106) to control air flow through the seat air inlet/outlet port. The poppet has an enlarged head portion (110) located at one end and a cam projection (113) located at the other end. A slide member (34) is supported on the upper surface of the lower housing for reciprocating movement relative to the housing to selectively control air flow therethrough. The slide member has an upper surface and a lower surface. The lower surface of the slide member has a cammed portion (68) to selectively and automatically permit rapid exhaustion of air from the seat air inlet/outlet port. The cam portion includes a detent notch (70) to selectively lock the slide member into continuous fluid communication with the seat air inlet/outlet port and the exhaust port to permit air to escape therethrough.

22 Claims, 11 Drawing Sheets

PNEUMATIC SEAT VALVE HAVING A RAPID EXHAUST MODE

FIELD OF THE INVENTION

The present invention relates generally to pneumatic seat valves and, more particularly, to pneumatic seat valves having a rapid exhaust mode of operation.

BACKGROUND OF THE INVENTION

In order to increase comfort, pneumatic seats have been developed for use in vehicles, such as long haul trucks. Pneumatic seats have a pedestal that includes one or more air bags, a seat supported by the pedestal, and a control valve for controlling the volume of air within the air bags. Controlling the volume of air within the air bag(s) permits the occupant to adjust the height of the seat to suit the occupant's preference. By increasing the volume within the air bag(s), the air bag(s) inflates and raises the height of the seat. Decreasing the volume within the air bag(s) deflates the air bag(s) and lowers the height of the seat. Additionally, the pressure within the air bag(s) helps isolate the occupant from over the road vibration and bouncing when compared to non-pneumatic seats. Thus, the air bag(s) of a pneumatic seat functions not only as a shock absorber, but also as a seat height adjuster.

As noted above, air volume within the air bag(s) of a pneumatic seat may be adjusted by the control valve. Common control valves for pneumatic seats have a control paddle, an air bag inlet/outlet stem, an exhaust port, a slide member, and an air inlet stem. The air inlet stem is adapted to receive compressed air from an external source located elsewhere in the vehicle. The air bag inlet/outlet stem is in fluid communication with the air bag of the seat by an air hose. The air inlet stem may be selectively placed into fluid communication with the air bag inlet/outlet stem by an internal channel located within the slide member. The exhaust port selectively vents air from within the air bag inlet/outlet stem. The slide member is reciprocally mounted within the control valve, such that it may be reciprocated between a fill position, an exhaust position, and a closed position.

In the fill position, pressure is applied by the seat occupant to the control paddle of the control valve to slide the slide member within the control valve. As the slide member is slid within the control valve, the air inlet and air bag inlet/outlet stems are placed into fluid communication. Compressed air is permitted to flow through the control valve to supply air to the air bag, thereby inflating the air bag to the desired height. After the desired seat height is reached, the occupant releases the control valve to place the control valve back into its normal closed position, wherein airflow between the inlet and air bag inlet/outlet stems is blocked by the slide member. The seat height is maintained by the volume of air within the air bag until the occupant reactuates the control valve to lower the seat.

When the occupant desires to lower the seat, such as to its minimum level when leaving the cab of a truck, the occupant toggles the control paddle into the exhaust position to vent air from within the air bag. In most pneumatic control valves currently available, the occupant must apply a continuous pressure to the control paddle until the seat is at the desired height. In the exhaust position, the slide member is reciprocated within the control valve, such that the air bag inlet/out stem is placed into fluid communication with the exhaust port located within the control valve. The exhaust port vents the air to the atmosphere, thereby deflating the air bag and lowering the seat.

Prior attempts at automatically deflating the air bag of a pneumatic seat without requiring the occupant to continuously apply a pressure to the valve have resulted in moderately complex valves. One such valve utilizes a pin located on the exterior of the control valve that is used to lock the control paddle into the exhaust position. In such a valve, after the control paddle is displaced into the appropriate position, the pin is positioned to interfere with the control paddle and maintain it in the desired position. This often requires the occupant to use two hands to deflate the air bag; one hand to toggle the control paddle into the desired position and the other hand to lock the pin against the control paddle. Further, because such a valve requires the use of a pin to lock it into an automatic mode, this type of control valve tends to be larger then control valves without the pin. Therefore, although such control valves are effective at adjusting the height of pneumatic seats, they tend to be larger and more complicated to operate than desired.

Thus, there exists a need for a relatively simple and compact control valve for pneumatic seats that provides an automatic mode, wherein the valve is selectively held in an exhaust position to rapidly exhaust compressed air from the air bag of the seat. The present invention is directed to fulfilling this need.

SUMMARY OF THE INVENTION

In accordance with the present invention, a pneumatic valve for use in the pneumatic seats of a vehicle is provided. The pneumatic valve has an upper housing and a lower housing slidably received within the upper housing. The lower housing has an upper surface and a lower surface defining an inlet port, a seat air inlet/outlet port, and at least a first exhaust port. A slide member is supported by the housing for reciprocating movement relative to the housing to selectively control airflow therethrough. The slide member has an upper surface and a lower surface. The lower surface of the slide member has a cammed portion to permit rapid exhaustion of air from within the seat by selectively locking the slide member into a rapid exhaust position. In the rapid exhaust position, the seat air supply portion is in continuous fluid communication with the exhaust portion to permit air from within the seat to escape therethrough.

In accordance with further aspects of this invention, the pneumatic valve also includes an elongate poppet and a first spring. The poppet has an enlarged head located at one end and a cam projection at the other end. The poppet is slidably mounted within the seat air inlet/outlet port on the first spring to control exhaust airflow therethrough. The first spring biases the poppet within the housing such that the head of the poppet is seated against the housing to prevent air from escaping therethrough.

In accordance with other aspects of this invention, the cammed portion of the slide member has a detent notch formed therein to selectively lock the slide member into the rapid exhaust position. When the slide member is in the rapid exhaust position, the detent notch of the slide member compresses the poppet against the first spring to unseat the poppet and permit air to pass through the seat air inlet/outlet port and out the exhaust port.

In accordance with yet other aspects of this invention, the pneumatic valve also includes a second spring disposed within the lower surface of the slide member to bias the pneumatic valve into a closed position, wherein the slide member blocks airflow through the pneumatic valve.

A pneumatic valve formed in accordance with the present invention has several advantages over pneumatic control valves used in the past in pneumatic seats. The detent notch allows the occupant to rapidly exhaust air from within the pneumatic seat by simply toggling the slide member of the valve to engage a cam projection located therein. The detent notch selectively locks the pneumatic valve into the rapid exhaust position without requiring the occupant to apply a constant pressure to the valve to maintain it in an exhaust position. Furthermore, such a pneumatic valve does not require an external locking mechanism, such as a pin, to maintain the valve in a given position. Thus, a pneumatic valve formed in accordance with the present invention is simpler to operate then pneumatic valves currently available in the art.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
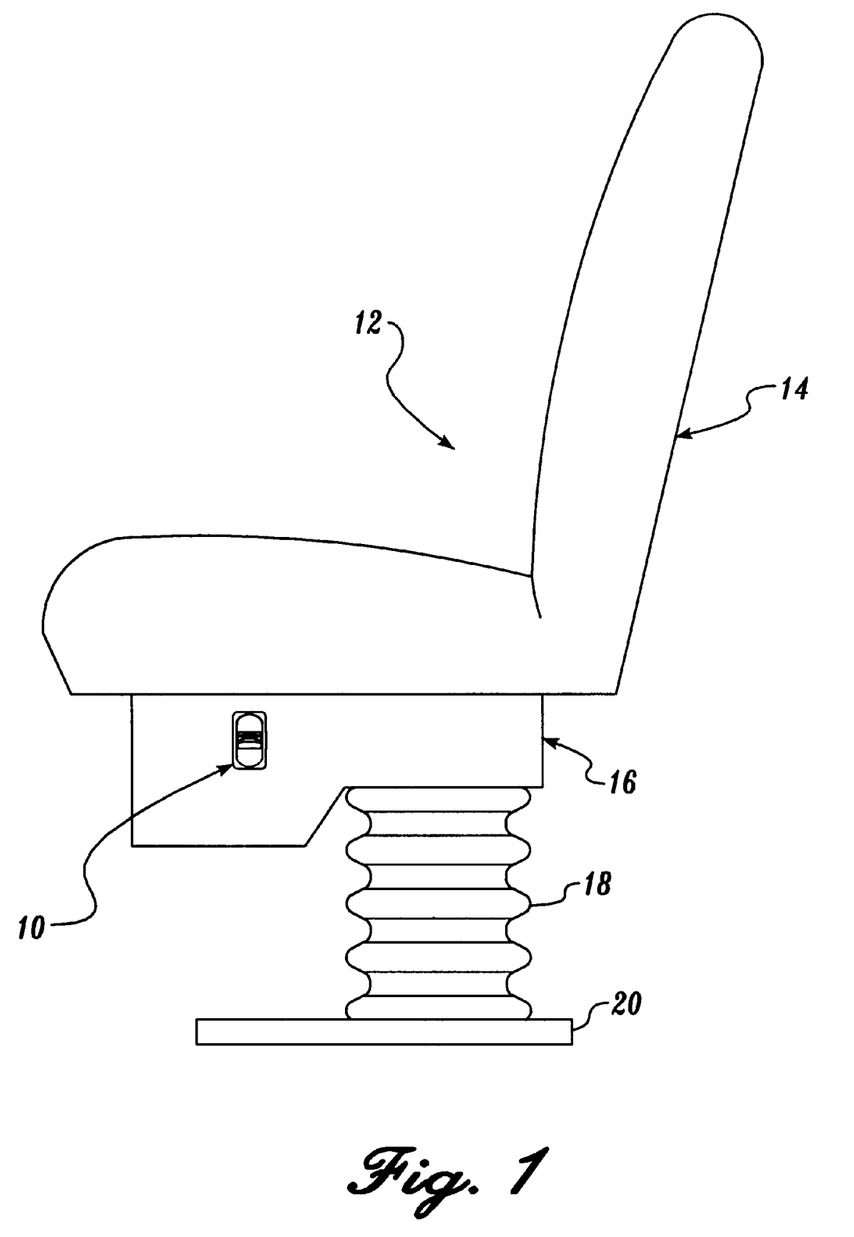
FIG. 1 is a side environmental view of a pneumatic valve constructed in accordance with the present invention as it would be used in a pneumatic seat of a vehicle.

FIG. 1 illustrates a preferred embodiment of a pneumatic seat valve 10 constructed in accordance with the present invention. The valve 10 is mounted in an air pressure line (not shown) of a pneumatic seat 12. The pneumatic seat 12 is of the type commonly used in long-haul vehicles such as trucks. Such pneumatic seats 12 generally include a seat portion 14 supported by a seat frame 16. The seat frame 16 is in turn positioned atop a pedestal cushioned by an air bag 18. Although the pneumatic seat 12 is illustrated as being cushioned by a single air bag, a pneumatic seat cushioned by more than one air bag is also within the scope of the invention. The opposite end of the air bag 18 is mounted upon a seat base 20 that is in turn affixed to the floor (not shown) of the truck. A pneumatic source (not shown) supplies pressurized air to the air bag 18 via the seat valve 10. While normally used in a horizontal orientation, as shown in FIG. 1, for ease of illustration the seat valve is shown in a vertical orientation in FIGS. 2 and 4A through 7B. In this regard, the terminology vertical, lower, upper, etc., should be construed as descriptive, not limiting.

Figure 2:
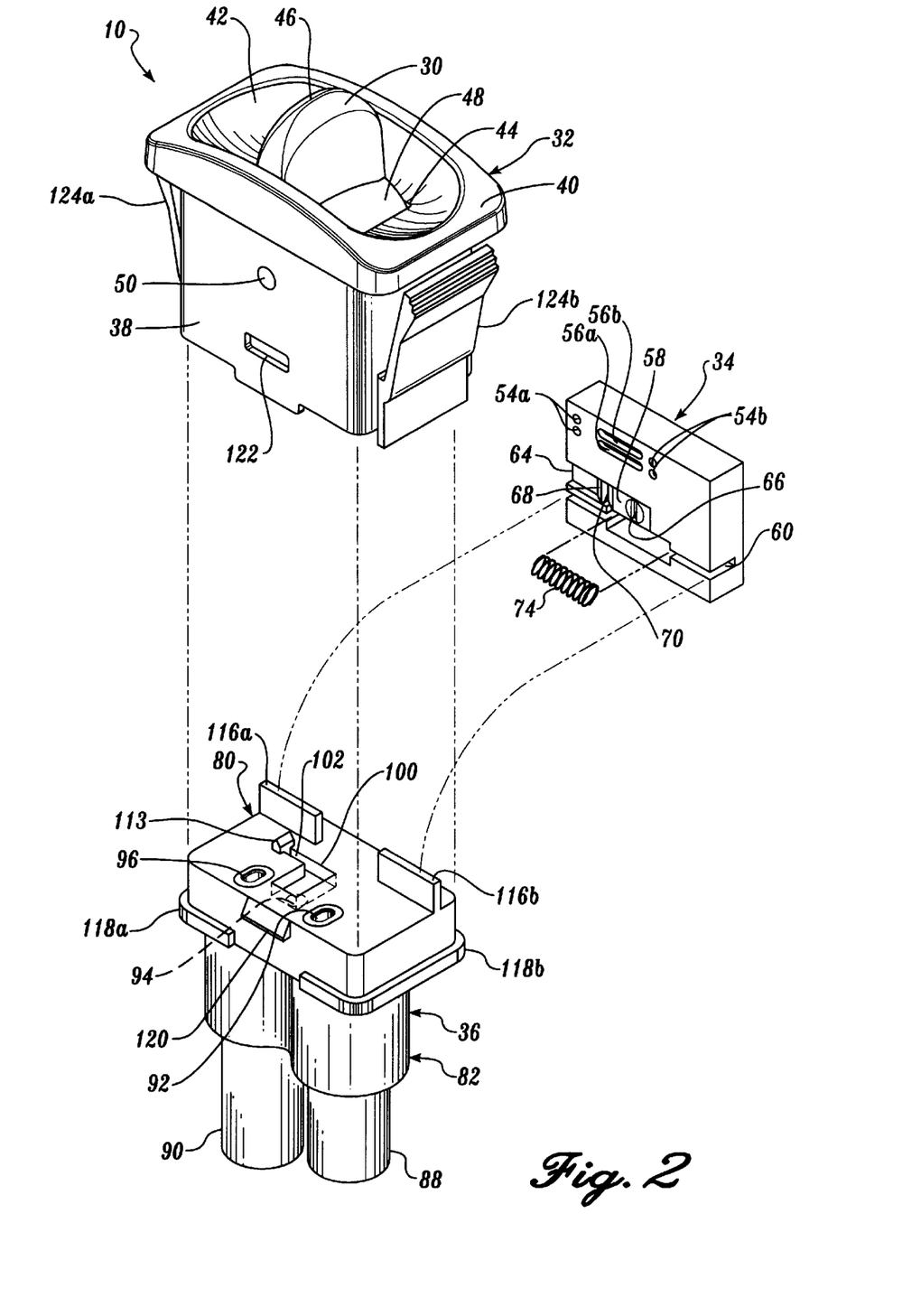
FIG. 2 is an exploded view of a pneumatic valve formed in accordance with the present invention showing the major elements of the pneumatic valve.
Figure 3:
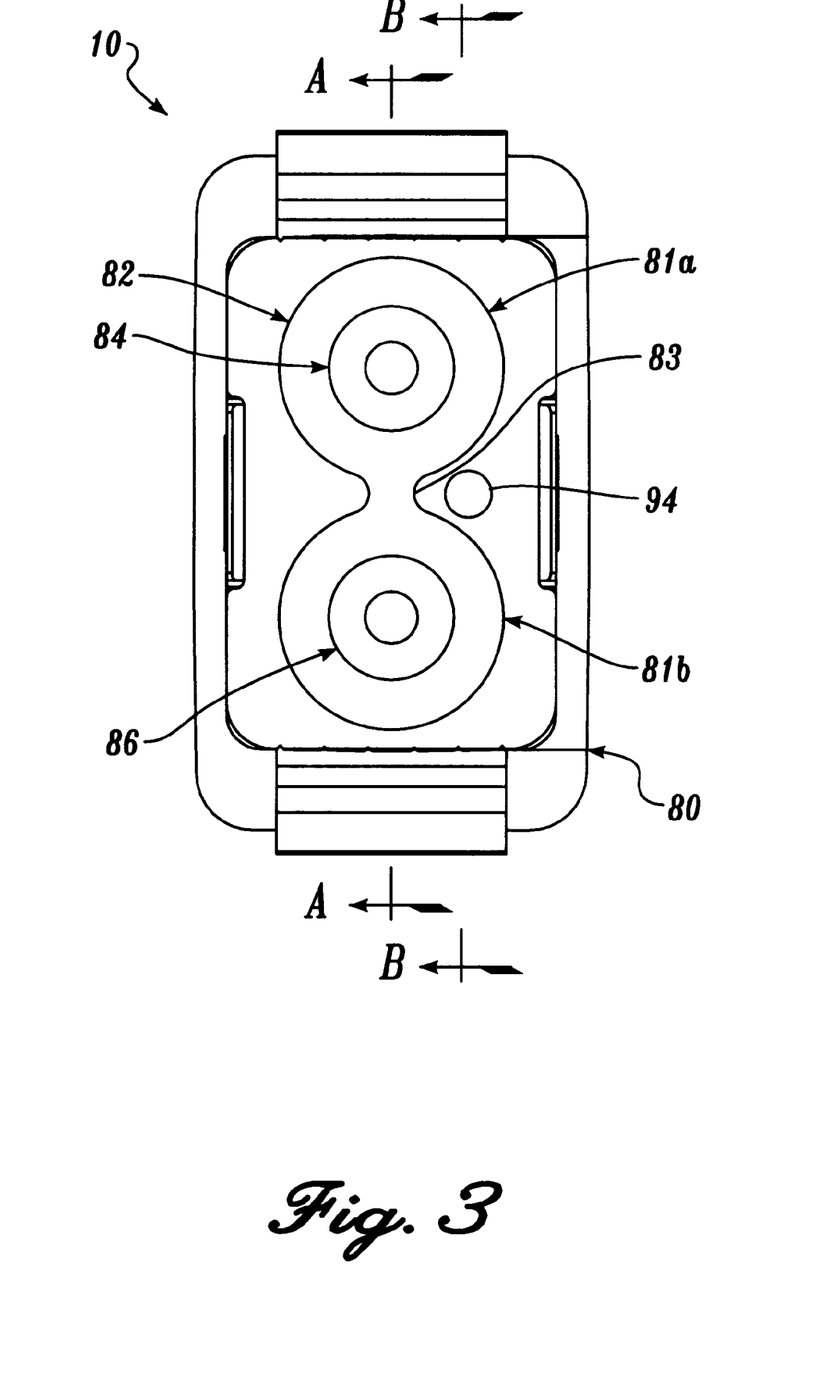
FIG. 3 is an end view of a pneumatic valve formed in accordance with the present invention.

Referring to FIGS. 2 and 3, the seat valve 10 will be described in greater detail. The seat valve 10, which is preferably manufactured from plastic, includes a toggle switch 30, a housing 32, a slide member 34, and a valve base 36. The housing 32 includes a lower housing portion 38 and a face plate 40. The lower housing portion 38 is rectangular in configuration and has a hollowed out center portion (not shown) extending vertically therethrough. The face plate 40 is preferably integrally formed with the upper end of the lower housing portion 38. The face plate 40 has a perimeter that is slightly larger than the perimeter of the lower housing portion 38, such that when the seat valve 10 is attached to the seat frame 16, the inwardly facing surface of the face plate 40 overlaps and is mounted flush against the seat frame 16. The face plate 40 also has an elongate concave portion 42 extending along a longitudinal axis defined between the ends of the face plate 40. A vertically extending hole 44 is centrally located in the bottom of the concave portion 42. The hole 44 is sized to receive the toggle switch 30.

Figure 4A:
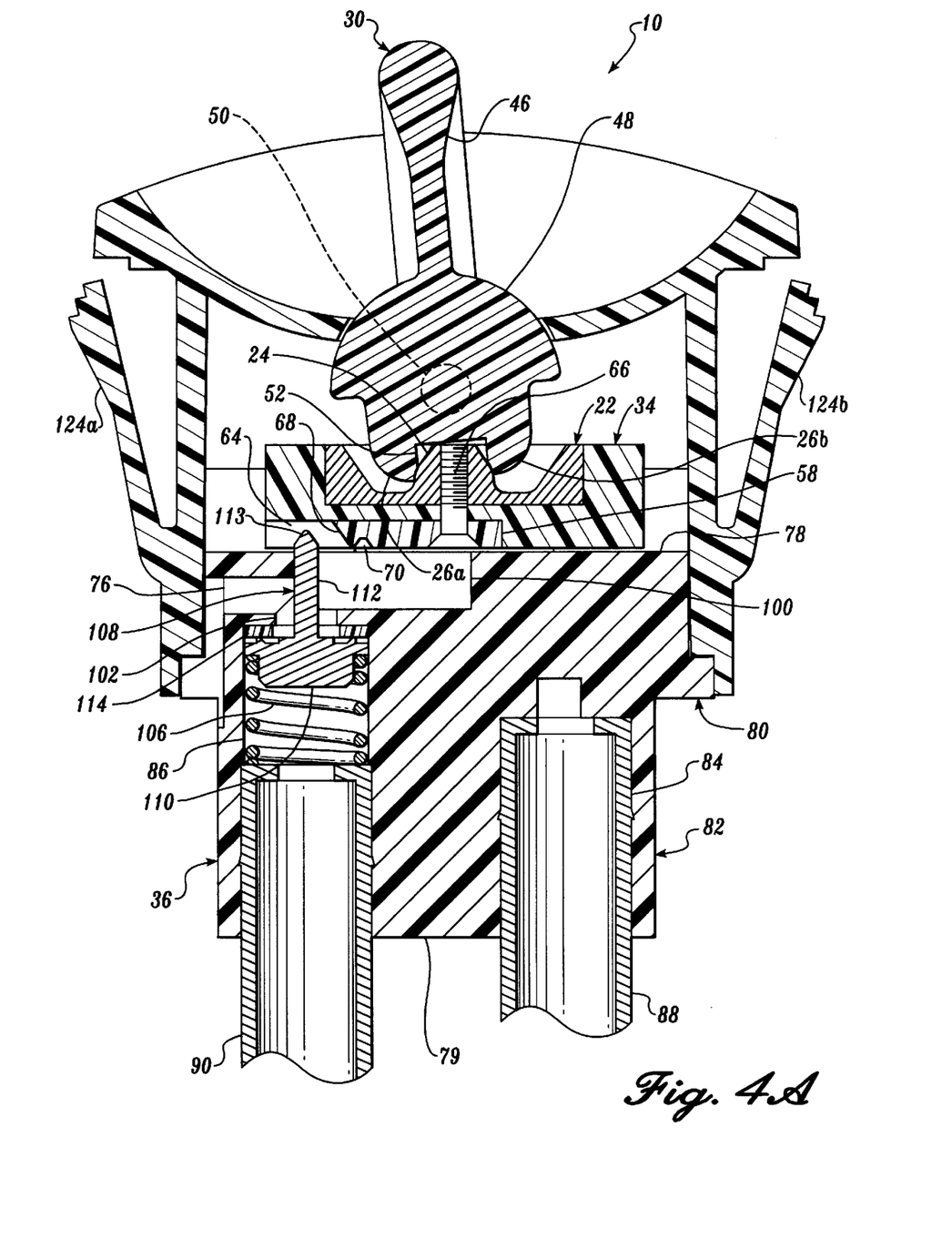
FIG. 4A is a cross-sectional view of a pneumatic valve formed in accordance with the present invention shown in a closed position and taken substantially along section line A—A of FIG. 3.

As seen in FIGS. 2 and 4A, the toggle switch 30 has a paddle 46 integrally formed with a base portion 48. The paddle 46 is sized to be slidably received within the hole 44 of the housing 32, such that it projects outwardly therefrom. The toggle switch 30 is pivotably mounted within the housing 32 by a pivot pin 50. The pivot pin 50 extends between the sides of the housing 32 and laterally through the base portion 48 of the toggle switch 30. The lower end of the base portion 48 of the toggle switch 30 is contoured to define an inverted U-shaped notch 52. The downwardly depending sides of the notch 52 define opposing first and second control tabs 26a and 26b. The notch 52 is adapted to be operatively received within the upper surface of the slide member 34.

Figure 4B:
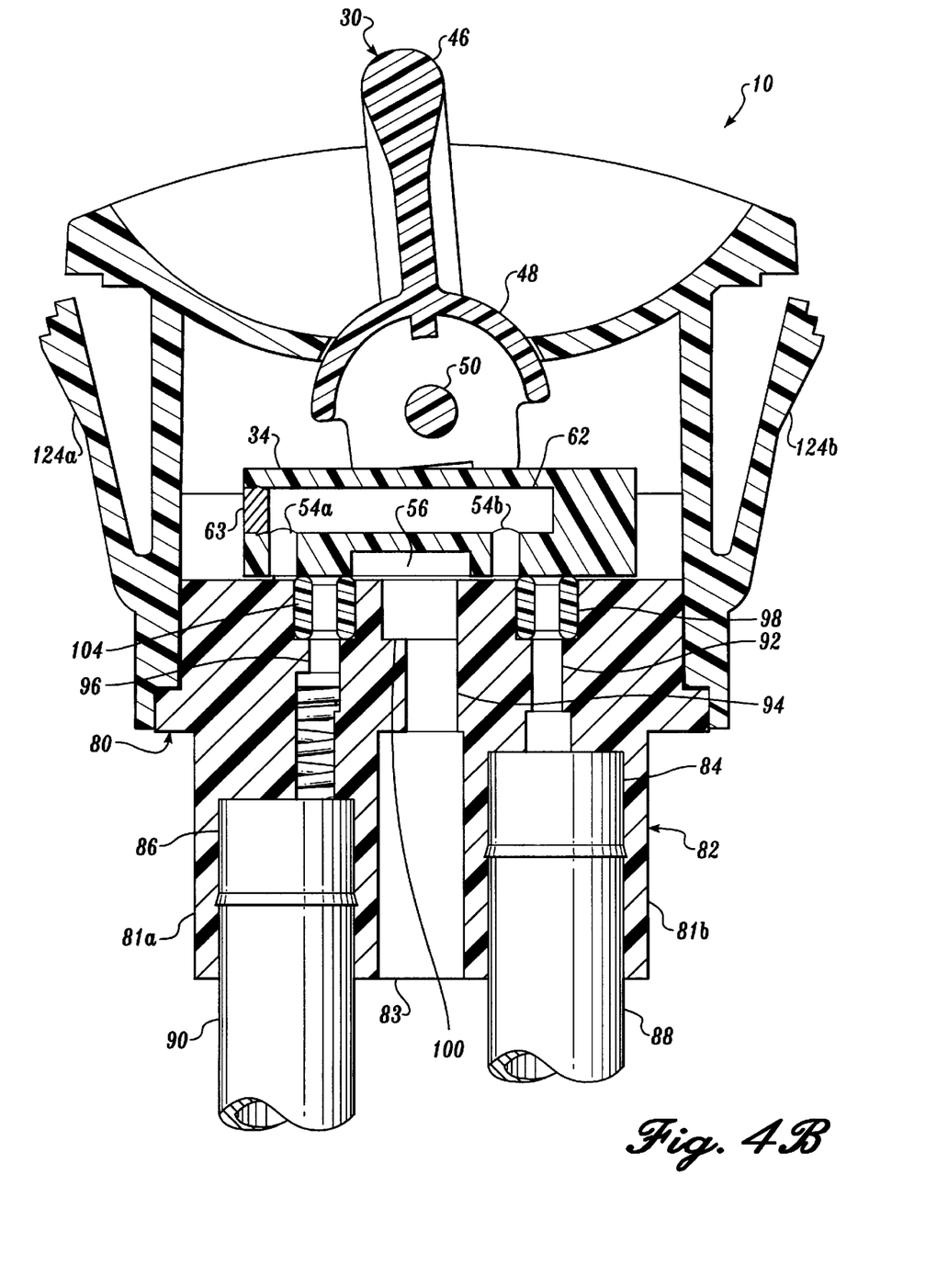
FIG. 4B is a cross-sectional view of a pneumatic valve formed in accordance with the present invention shown in a closed position and taken substantially along section line B—B of FIG. 3.

The slide member 34 may be best understood by referring to FIGS. 2, 4A, and 4B. As seen in FIG. 4A, the slide member 34 is rectangular in cross-sectional configuration and the upper surface thereof has an elongate plate 22 mounted therein. The plate 22 is sized to be positioned within a rectangularly shaped cavity centrally located within the upper surface. The plate 22 is rigidly fastened within the cavity by a fastener 66 extending vertically through the slide member 34 and the plate 22. The plate 22 is seated within the cavity such that the upper surface thereof is flush with the upper surface of the slide member 34. The plate 22 is contoured across its width to define a centrally located and upwardly projecting peg 24. The peg 24 is sized to be received within the notch 52 of the toggle switch 30, such that as the toggle switch 30 is pivoted about the pivot pin 50, one of the control tabs 26a and 26b of the notch 52 pushes against a corresponding side of the peg 24 to reciprocate the slide member 34 within the seat valve 10. Although the peg 24 is illustrated as part of a separate plate, other configurations, such as a control peg integrally formed with the upper surface of the slide member, are also within the scope of the invention.

As seen in FIG. 2, the lower surface of the slide member 34 has first and second sets of airflow ports 54*a* and 54*b*, first and second elongate exhaust flow cavities 56*a* and 56*b*, a cam plate 58, and an attachment groove 60. As may be seen better by referring to FIG. 4B, the first and second sets of airflow ports 54*a* and 54*b* extend vertically from the lower surface of the slide member 34 a predetermined distance to where they intersect an elongate flow channel 62. The flow channel 62 extends from one end of the slide member 34 and partially through the length thereof. The flow channel 62 extends normally between the inner ends of the first and second sets of airflow ports 54*a* and 54*b*. The open end of the flow channel 62 is sealed with a plug 63. As configured, the flow channel 62 places the first and second sets of airflow ports 54*a* and 54*b* into fluid communication with each other to permit compressed air to flow from the external pneumatic source (not shown) to the air bag 18, as is described in greater detail below.

The first and second exhaust cavities 56*a* and 56*b* may be best understood by referring to FIGS. 2 and 4B. The exhaust flow cavities 56*a* and 56*b* extend partially between the first and second sets of airflow ports 54*a* and 54*b*. The exhaust flow cavities 56*a* and 56*b* are located on the lower surface of the slide member 34, such that length thereof is parallel with a longitudinal axis extending normally between the ends of the slide member 34. Each exhaust flow cavity 56*a* and 56*b* extends vertically from the lower surface of the slide member 34 to a predetermined distance into the slide member 34, without intersecting the flow channel 62.

Referring to FIGS. 2 and 4A, the cam plate 58 is fastened within a rectangularly shaped slot 64 located within the lower surface of the slide member 34. The slot 64 extends from one end of the slide member 34 to a point located substantially midway between the ends of the slide member 34. The end of the slot 64 corresponding with the end of the slide member 34 defines an open end of the slot 64, and the opposite end thereof defines a closed end. The width and depth of the slot 64 are sized to receive the cam plate 58 therein and the cam plate 58 is preferably manufactured from plastic. Although it is preferred that the cam plate 58 be a separate member from the side member 34, other configurations, such as a cammed surface integrally formed as part of the lower surface of the slide member, are also within the scope of the invention.

The cam plate 58 is rectangular in configuration and has a length that is less than the length of the slot 64. The cam plate 58 is fastened within the slot 64 by the fastener 66, such as a screw, extending vertically therethrough and into the slide member 34. The cam plate 58 is positioned with the slot 64 such that one end thereof abuts the closed end of the slot 64. The lower surface of the cam plate 58 is flush with the lower surface of the slide member 34 when it is mounted within the slot 64.

As may be seen better by referring to FIG. 4A, the end of the cam plate 58 facing the open end of the slot 64 is contoured to define a cam portion 68. The cam portion 68 extends across the width of the cam plate 58 and slopes downwardly at a predetermined angle from the top to the bottom of the cam plate 58. The cam portion 68 is angled towards the opposite end of the cam plate 58. Thus, the cam portion 68 slopes from the bottom of the slot 64 and away from the open end of the slot 64.

Positioned adjacent the cam portion 68 is a detent notch 70. The detent notch 70 is formed in the lower surface of the cam plate 58 and is located slightly inboard of the cam portion 68, towards the closed end of the slot 64. The detent notch 70 is V-shaped in configuration and extends across the width of the cam plate 58. The detent notch 70 is positioned on the cam plate 58 to selectively lock the seat valve 10 into a rapid exhaust position when the slide member 34 is reciprocally mounted on the valve base 36 by the attachment groove 60.

Referring back to FIG. 2, the attachment groove 60 is located in the lower surface of the slide member 34 and extends longitudinally between the first and second ends of the slide member 34. The center of the attachment groove 60, defined substantially midway between the ends of the slide member 34, is sized to receive a first coil compression spring 74 therein. The first spring 74 biases the seat valve 10 into a closed position when the slide member 34 is mounted within the seat valve 10 on the valve base 36, as is described in greater detail below.

The valve base 36 has a housing attachment portion 80 and an air hose connection portion 82. The attachment portion 80 is rectangular in configuration and the lower surface thereof is integrally formed with upper surface of the connection portion 82. Thus, as formed, the upper surface of the attachment portion 80 defines the upper surface 78 of the valve base 36 and the lower surface of the connection portion 82 defines the lower surface 79 of the valve base 36. Although it is preferred that the attachment portion 80 is integrally formed with the connection portion 82, other configurations, such as separate attachment and connection portions fastened together, are also within the scope of the present invention.

The air hose connection portion 82 may be best understood by referring to FIGS. 3 and 4A. The air hose connection portion 82 has cylindrically shaped first and second ends 81*a* and 81*b* held in spaced parallel disposition by a centrally located web 83. The web 83 is integrally formed with the opposed surfaces of the ends 81*a* and 81*b* and extends therebetween. The ends 81*a* and 81*b* of the connection portion 82 have first and second bores 84 and 86 extending from the lower surface 79 and partially through the vertical direction thereof, such that the first bore 84 extends partially through the first end 81*a* and the second bore 86 extends partially through the second end 81*b*.

As may be seen better in FIG. 4A, diameters of the first and second bores 84 and 86 are sized to receive first and second brass air hose connectors 88 and 90 therein. The ends of the first and second air hose connectors 88 and 90 received within the connection portion 82 are barbed, such that when the first and second air hose connectors 88 and 90 are pressed into the first and second bores 84 and 86, the barbed ends of the connectors are seated within the bores to resist the withdrawal of the connectors 88 and 90 from valve base 36. The free ends of the first and second air hose connectors 88 and 90 are adapted to receive and fasten air hoses (not shown) to the seat valve 10, in a manner well known in the art of barb fitting.

Referring to FIGS. 2 and 4B, attention is now drawn to the housing attachment portion 80 of the valve base 36. The attachment portion 80 has an air inlet port 92, an exhaust port 94, and an seat air inlet/outlet port 96. The ports 92, 94, and 96 are aligned along a longitudinal axis extending between the ends of the attachment portion 80. The air inlet port 92 is aligned in the vertical direction with the first bore 84. The air inlet port 92 extends vertically from the upper surface 78 of the valve base 36 and downwardly therein until it intersects the base of the first bore 84, thereby placing the air inlet port 92 into fluid communication with the first bore 84. The upper end of the air inlet port 92, adjacent the upper surface 78 of the valve base 36, is sized to receive a first O-ring 98 therein.

The seat air inlet/outlet port 96 is aligned in the vertical direction with the second bore 86. The seat air inlet/outlet port 96 extends vertically from the upper surface 78 of the valve base 36 and downwardly therein until it intersects the base of the second bore 86, thereby placing the seat air inlet/outlet port 96 into fluid communication with the second bore 86. A second O-ring 104 is seated within the upper end of the seat air inlet/outlet port 96.

The exhaust port 94 is located on the upper surface of the attachment portion 80 within an exhaust canal 100. The exhaust port 94 is positioned substantially midway between the air inlet port 92 and the seat air inlet/outlet port 96 and extends vertically between upper and lower surfaces of the attachment portion 80. The lower end of the exhaust port 94 is located adjacent and on the outboard side of the web 83 extending between the first and second ends 81*a* and 81*b* of the air hose connection portion 82 to vent air from within the seat air inlet/outlet port 96 to the atmosphere.

As seen in FIG. 2, the exhaust canal 100 is substantially L-shaped in configuration. The exhaust canal 100 is oriented on the upper surface of the attachment portion 80 such that the base portion thereof extends partially between the sides of the attachment portion 80 and its spine portion is aligned parallel with a longitudinal axis extending between the ends of the attachment portion 80. The head of the spine portion of the exhaust canal 100 is aligned in the vertical direction with the second bore 86 and is in fluid communication therewith by a third bore 102. As seen in FIG. 4A, the third bore 102 extends vertically between the lower surface of the exhaust canal 100 and the base of the second bore 86, such that air within the air bag 18 may be selectively vented therethrough, as is described in greater detail below.

Still referring to FIG. 4A, the attachment portion 80 also includes a side exhaust port 76. The side exhaust port 76 extends laterally from the end surface of the attachment portion 80, above the second bore 86, inwardly towards the other end thereof until it intersects the head of the spine portion of the exhaust canal 100. The side exhaust port 76 also intersects the third bore 102, such that air from within the second bore 86 may be vented through both the side exhaust port 76 and the exhaust canal 100, as is described in greater detail below.

The seat valve 10 also includes a poppet 108 to selectively control exhaust airflow out of the seat air inlet/outlet port 96. The poppet 108 has an enlarged head portion 110 and a stem portion 112 extending therefrom. The poppet 108 is slidably received within the second bore 86, such that the stem portion 112 projects upwardly through the second bore 86, into the vertically aligned third bore 102, and outwardly from the upper surface 78 of the valve base 36. The tip portion of the poppet 108 projecting from the upper surface 78 defines a cam projection 113. The head portion 110 of the poppet 108 is seated within the second bore 86 on one end of a second coil compression spring 106. The other end of the second spring 106 is seated against the end of the second air hose connector 90 received within the second bore 86. The second spring 106 normally biases the poppet 108 upwardly within the second bore 86, such that the head portion 110 of the poppet 108 is seated against a seal 114 to prevent air from flowing out through the third bore 102.

The cam projection 113 is positioned within the valve base 36 such that it is received within the slot 64 of the slide member 34 when the slide member 34 is mounted to the valve base 36. The slide member 34 is reciprocally mounted to the valve base 36 on first and second guide flanges 116*a* and 116*b*. The guide flanges 116*a* and 116*b* are rectangular in configuration and project upwardly from the upper surface 78 of the valve base 36. The guide flanges 116*a* and 116*b* are mounted on the upper surface 78 such that the length of each flange is aligned along a longitudinal axis extending between the ends of the attachment portion 80. The guide flanges 116*a* and 116*b* are sized to be received within the attachment groove 60 located in the lower surface of the slide member 34. The guide flanges 116*a* and 116*b* are spaced on the upper surface 78 of the valve base 36 to receive the first compression spring 74 therebetween when the guide flanges 116*a* and 116*b* are received within the attachment groove 60. One end of the first spring 74 is seated against the inboard facing surface of the first guide flange 116*a*. The other end of the spring 74 is seated against the opposing inboard facing surface of the second guide flange 116*b*, such that the first spring 74 biases the slide member 34 into the closed position.

As briefly noted above, the valve base 36 is sized to be slidably received within the lower end of the housing 32. As assembled, the lower surface of the housing 32 is seated on first and second rims 118*a* and 118*b* extending partially around the perimeter of the lower end of the attachment portion 80. The first and second rims 118*a* and 118*b* are spaced to receive a pair of downwardly projecting tabs, centrally located on the lower surface of the housing 32. The housing 32 is fastened to the valve base 36 by well-known fasteners, such as screws or a snap connector. In the preferred embodiment, the housing 32 is fastened to the valve base 36 by tabs 120 centrally located on both sides of the attachment portion 80. The tabs 120 may be slidably received within corresponding holes 122 located on both sides of the lower end of the housing 32.

The assembled seat valve 10 may be slidably received within a valve mounting hole (not shown) located in the seat frame 16. The seat valve 10 is fastened therein by a pair of mounting tabs 124*a* and 124*b*. The mounting tabs 124*a* and 124*b* are located on the ends of the housing 32 and have one end that is integrally formed with the sides of the housing 32, near the lower end thereof. The other end of the mounting tabs 124*a* and 124*b* is serrated and is sized to lock into complimentary grooves (not shown) located within the valve mounting hole of the seat frame 16, thereby fastening the seat valve 10 to the pneumatic seat 12.

Operation of the seat valve 10 of the present invention may be best understood by referring to FIGS. 4–7. The seat valve 10 has four distinct positions; a closed position, a fill position, a vent position, and a rapid exhaust position.

The closed position may be best understood by referring to FIGS. 4A and 4B. In FIG. 4A, the toggle switch 30 is biased into a nearly vertical upright position by the first compression spring 74. The first compression spring 74 also biases the slide member 34 into a centrally located position on the upper surface 78 of the valve base 36. The head portion 110 of the poppet 108 is urged upwardly against the seal 114 to prevent air from within the second air hose connector 90 from exhausting out through the third bore 102. As seen in FIG. 4B, airflow between the first air hose connector 88 to the second air hose connector 90 is blocked by the lower surface of the slide member 34. The lower surface of the slide member 34 blocks the air inlet port 92 and the seat air inlet/outlet port 96. The first and second O-rings 98 and 104 ensure an air tight seal between the first and second O-rings 98 and 104 and the lower surface of the slide member 34. Thus, in the closed position, airflow through the seat valve 10 is blocked by the slide member 34.

Figure 5A:
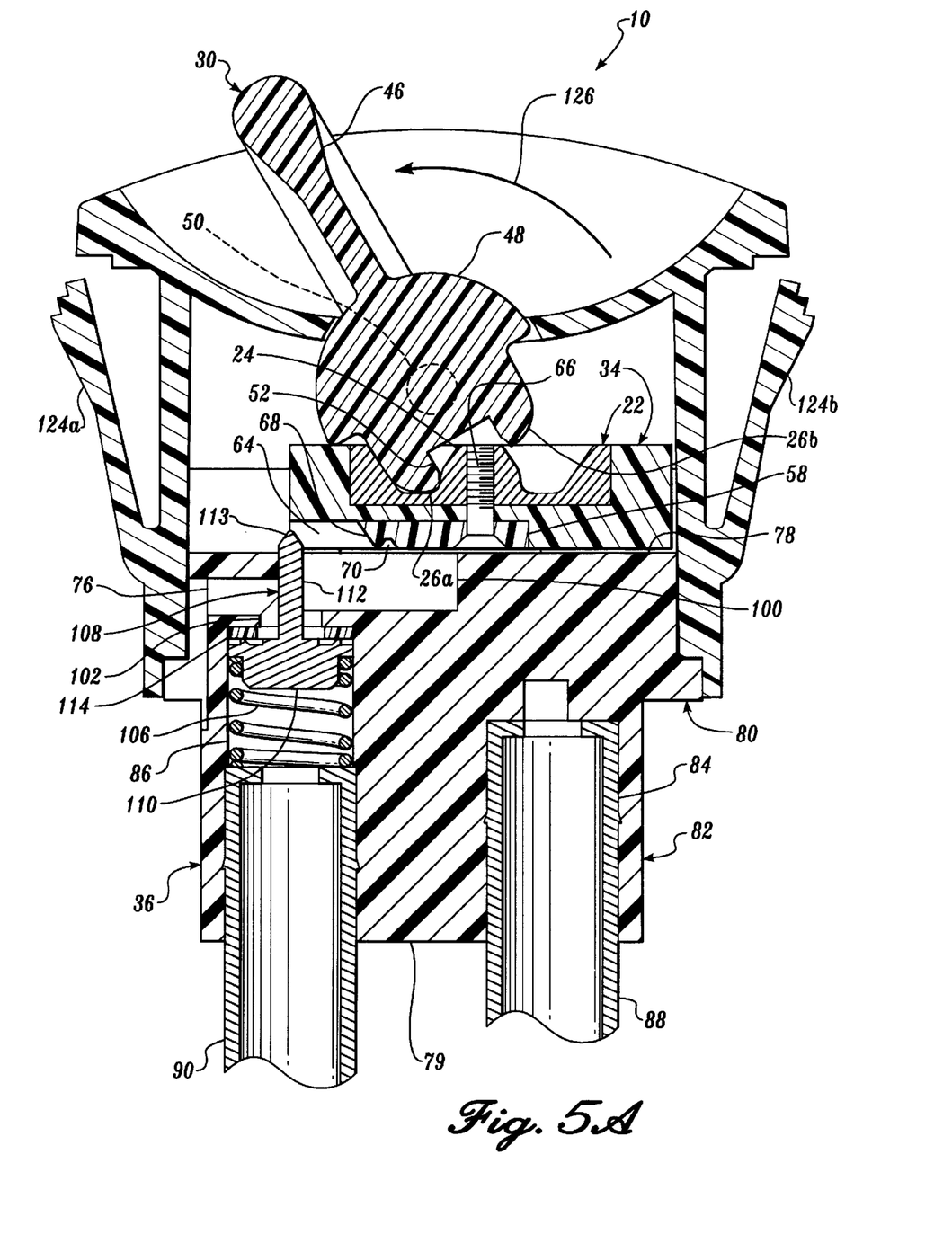
FIG. 5A is a cross-sectional view of a pneumatic valve formed in accordance with the present invention shown in a fill position and taken substantially along section line A—A of FIG. 3.
Figure 5B:
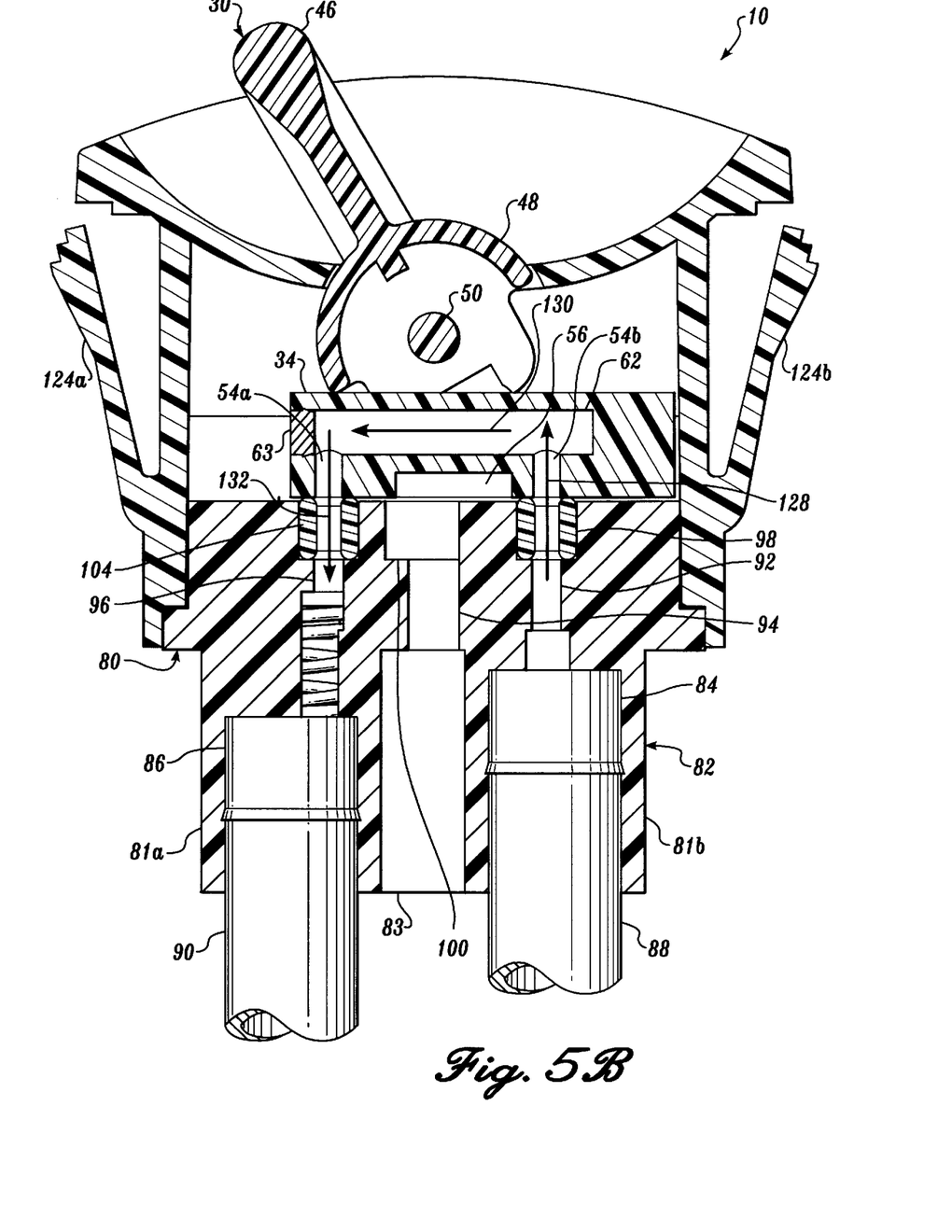
FIG. 5B is a cross-sectional view of a pneumatic valve formed in accordance with the present invention shown in a fill position and taken substantially along section line B—B of FIG. 3.

The fill position may be best understood by referring to FIGS. 5A and 5B. The seat valve 10 may be actuated into the fill position by toggling the toggle switch 30 in a counter-clockwise direction about the pivot pin 50, as indicated by the arrow 126. As the toggle switch 30 rotates about the pivot pin 50, the first control tab 26b pushes against the corresponding side of the peg 24 located in the upper surface of the side member 34. As the toggle switch 30 continues to rotate about the pivot pin 50, the first control tab 26a slides the slide member 34 across the upper surface 78 of the base 26, such that the slide member 34 is positioned on the right-hand side of the valve base 36, as seen in FIG. 5A.

As may be seen better in FIG. 5B, when the slide member 34 is positioned on the right-hand side of the seat valve 10, the air inlet port 92 and seat air inlet/outlet port 96 are placed into fluid communication with each other to fill the air bag 18. When the seat valve 10 is in the fill position, the first and second sets of airflow ports 54a and 54b of the slide member 34 are coaxially aligned in the vertical direction with the seat air inlet/outlet port 96 and air inlet port 92, respectively. Thus, air is permitted to flow from an external pneumatic source (not shown) through the air inlet port 92 and into the second set of airflow ports 54b, as indicated by the arrow 128. The air then flows internally through the slide member 34 through the flow channel 62, as indicated by the arrow 130. The air is channeled downwardly through the first set of airflow ports 54a and into the seat air inlet/outlet port 96, as indicated by the arrow 132. Air is then supplied to the air bag 18 by the second air hose connector 90 and into an air hose (not shown) mounted to the opposite end thereof. Air is permitted to flow through the seat valve 10 as long as the toggle switch 30 is in the fill position and held there by the seat occupant. Thus, the seat occupant is permitted to allow as much air into the air bag 18 to raise the pneumatic seat 12 to the desired height.

Figure 6A:
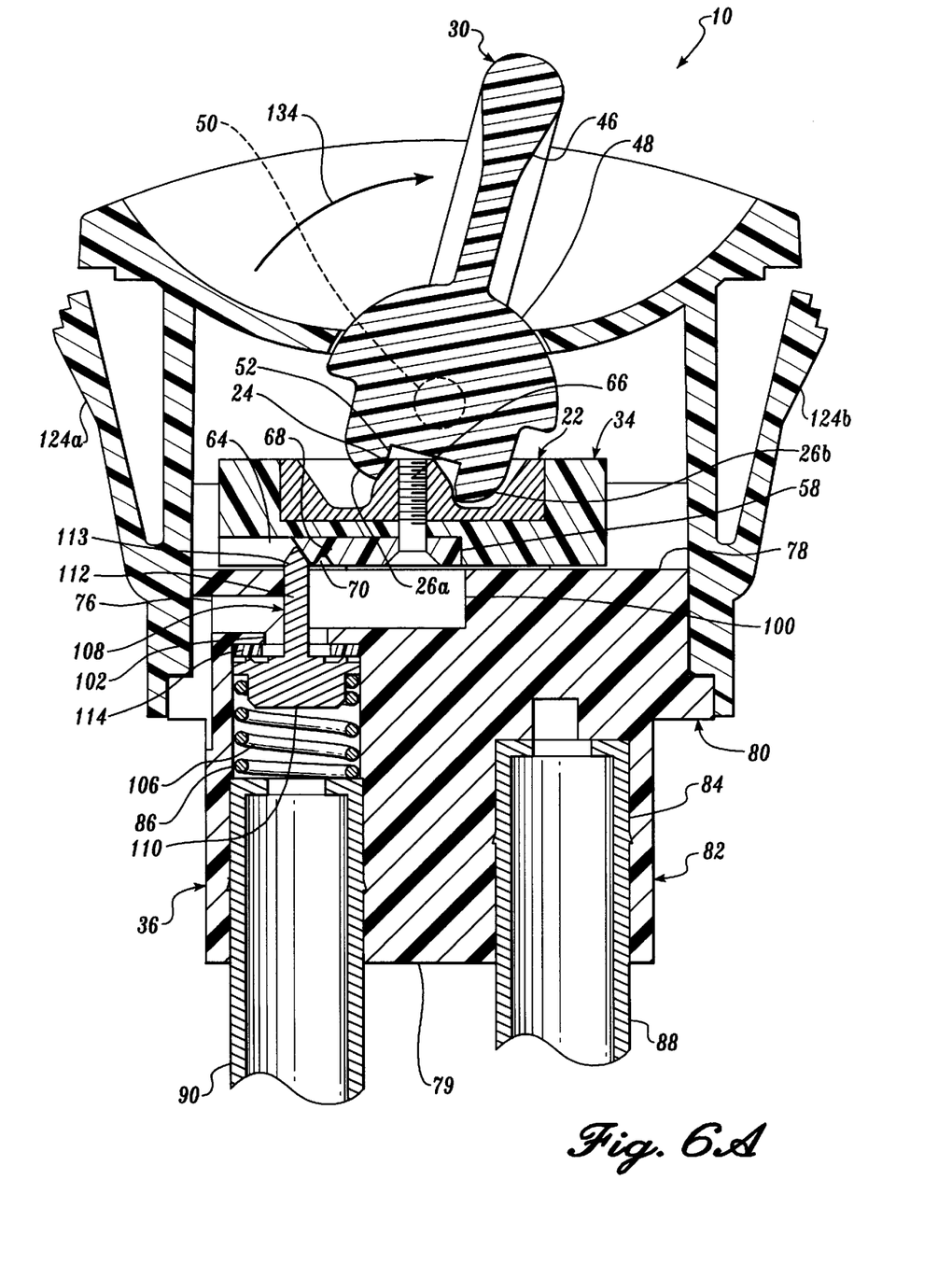
FIG. 6A is a cross-sectional view of a pneumatic valve formed in accordance with the present invention shown in a vent position and taken substantially along section line A—A of FIG. 3.
Figure 6B:
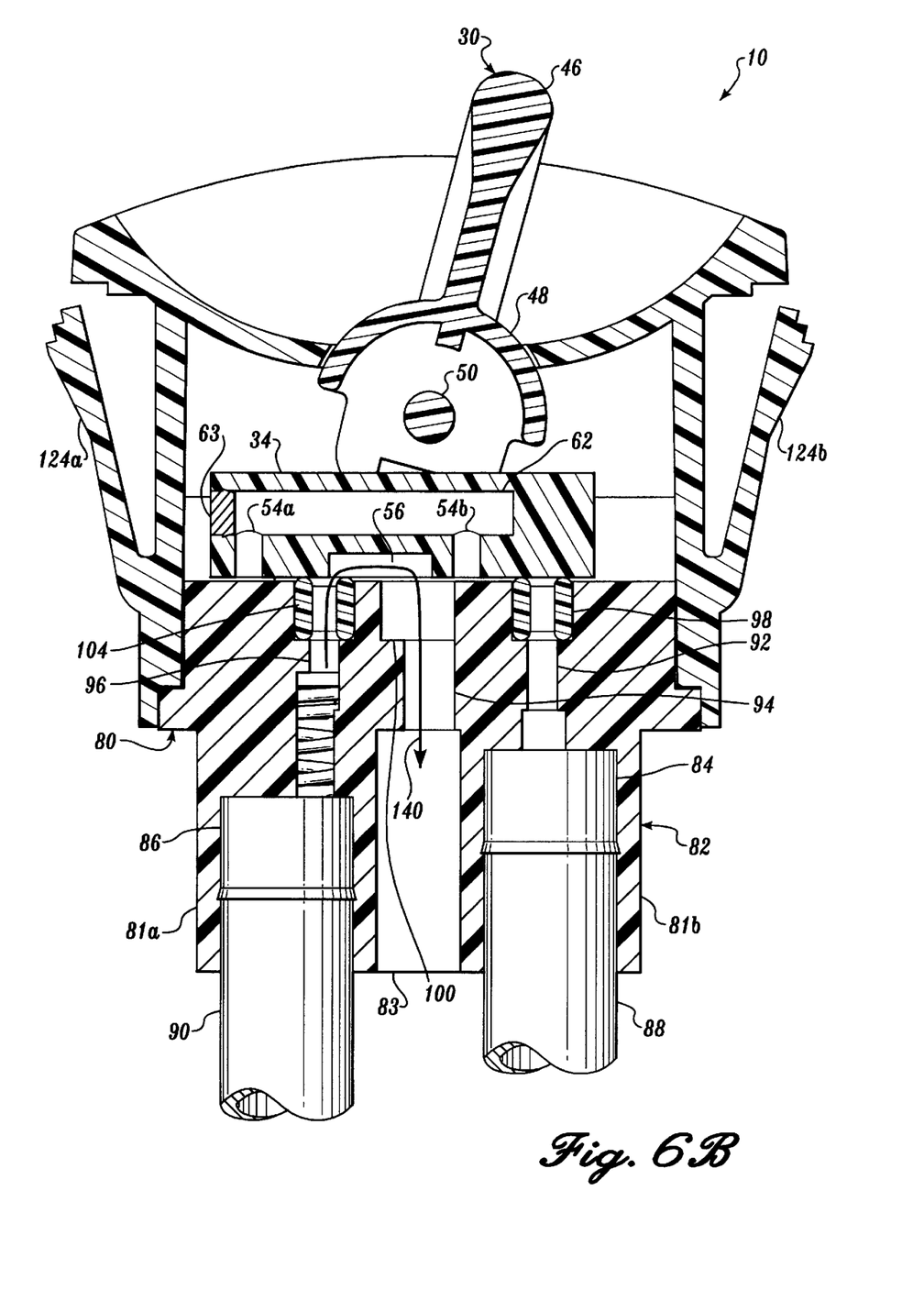
FIG. 6B is a cross-sectional view of a pneumatic valve formed in accordance with the present invention shown in a vent position and taken substantially along section line B—B of FIG. 3.

The vent position may be best understood by referring to FIGS. 6A and 6B. In the vent position the seat occupant may slowly exhaust air from within the air bag 18. In this position, the toggle switch 30 is rotated in a clockwise direction about the pivot pin 50 and as indicated by the arrow 134. As the toggle switch 30 is rotated about the pivot pin 50, the second control tab 26b pushes against the corresponding side of the peg 24 to slide the slide member 34 across the upper surface 78 of the valve base 36, towards the left side of the seat valve 10 as seen in FIG. 6A. As the slide member 34 is slid across the upper surface 78, the cam portion 68 comes into contact with the cam projection 113 of the poppet 108. The head portion 110 of the poppet 108 remains seated against the seal 114.

In the vent position, air is permitted to seep out both the side exhaust port 76 and the exhaust port 94, but mainly out of the exhaust port 94. Because the exhaust canal 100 is in fluid communication with the exhaust port 94, as described above, air from within the exhaust canal 100 flows therethrough and out the exhaust port 94.

As may be seen better by referring to FIG. 6B, in the vent position, air is permitted to flow through the seat air inlet/outlet port 96 and out the exhaust port 94, as indicated by the arrow 140. As the slide member 34 is positioned into the vent position, the first and second exhaust cavities 56a and 56b slide toward the center of the seat air inlet/outlet port 96, while remaining in fluid communication with the exhaust port 94, thereby placing the seat air inlet/outlet port 96 into direct fluid communication with the exhaust port 94. In the vent position, the seat occupant must apply a constant downward pressure on the toggle switch 30. Thus, the seat occupant is permitted to selectively adjust the air flow rate through the seat valve 10 to lower the pneumatic seat 12 to the desired height by holding the toggle switch 30 in the vent position.

Figure 7A:
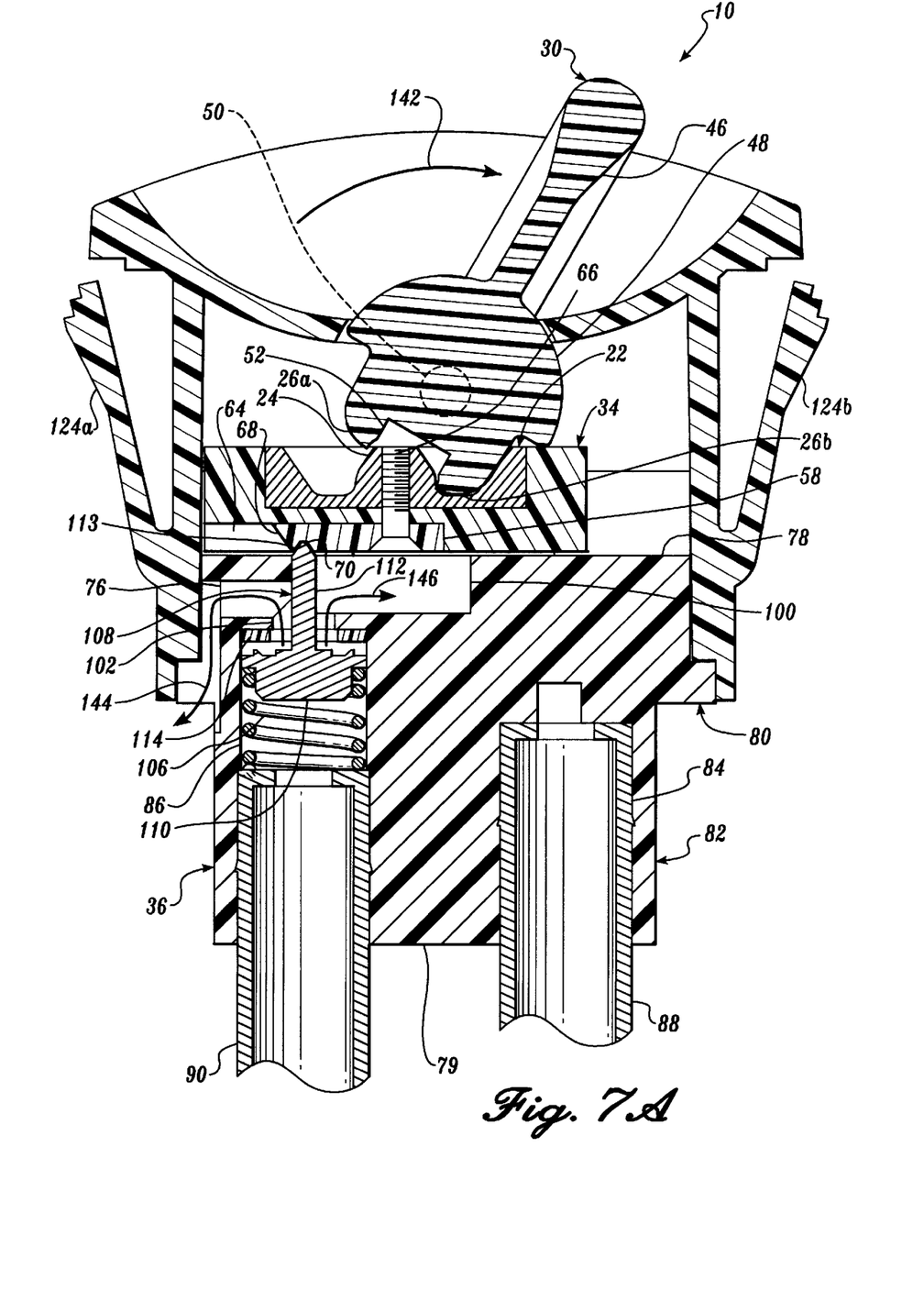
FIG. 7A is a cross-sectional view of a pneumatic valve formed in accordance with the present invention shown in a rapid exhaust position and taken substantially along section line A—A of FIG. 3.
Figure 7B:
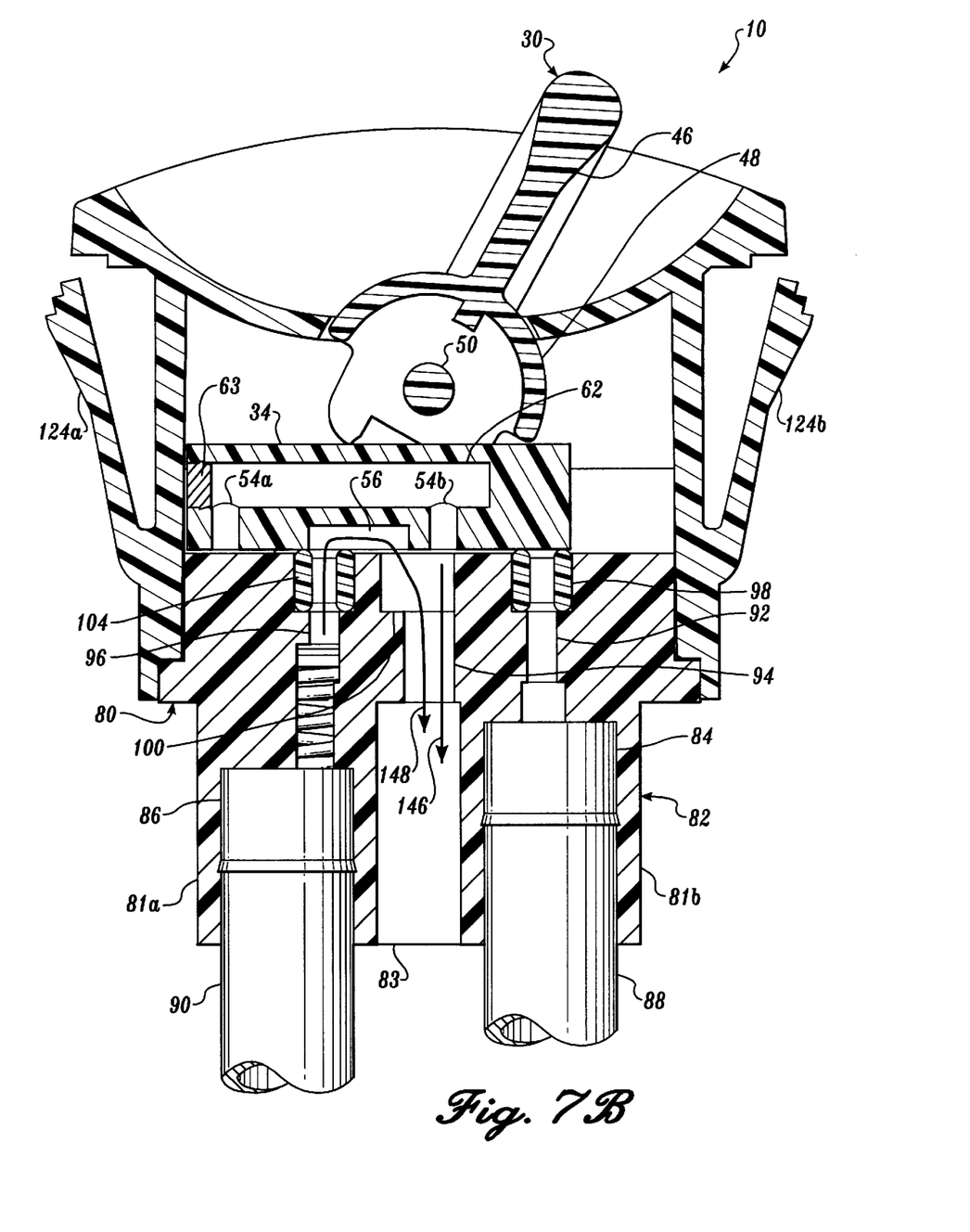
FIG. 7B is a cross-sectional view of a pneumatic valve formed in accordance with the present invention shown in a rapid exhaust position and taken substantially along section line B—B of FIG. 3.

The rapid exhaust position may be best understood by referring to FIGS. 7A and 7B. In the rapid exhaust position, air from within the air bag 18 may be rapidly vented therefrom without requiring the seat occupant to hold the toggle switch 30 in a given position, as previously described and required for the vent and fill positions. In the rapid exhaust position, the toggle switch 30 is rotated in a clockwise direction about the pivot pin 50, as indicated by the arrow 142. As the toggle switch 30 is rotated about the pivot pin 50, the second control tab 26b pushes against the corresponding side of the peg 24 to slide the slide member 34 to the left side of the seat valve 10, as seen in FIG. 7A. In this position, the cam projection 113 of the poppet 108 is driven downwardly against the second compression spring 106 until the cam projection 113 slides over the apex of the cam portion 68 and is seated within the detent notch 70. The slide member 34 is held in this position by the cam projection 113 without requiring the occupant to apply a continuous pressure thereto.

As seated within the detent notch 70, the poppet 108 is unseated from the seal 114, such that air is permitted to flow through the seat air inlet/outlet port 96 and outwardly through the side exhaust port 76, as indicated by the arrow 144. Air is also permitted to flow through the seat air inlet/outlet port 96 into the exhaust canal 100, as indicated by the arrow 146. Because the exhaust canal 100 is in fluid communication with the exhaust port 94, as described above, air from within the exhaust canal 100 flows therethrough and out the exhaust port 94.

As may be best seen in FIG. 7B, air is simultaneously permitted to flow through the seat air inlet/outlet port 96 and out the exhaust port 94, as indicated by the arrow 148. When the slide member 34 is locked into position by the poppet 108, the first and second exhaust cavities 56a and 56b are in full fluid communication with the seat air inlet/outlet port 96. In this position, air is permitted to flow from the seat air inlet/outlet port 96, through the exhaust cavities 56a and 56b, and out the exhaust port 94. Thus, the slide member 34 may be selectively locked into a rapid exhaust position to permit air from within the air bag 18 to be rapidly exhausted therefrom without requiring the occupant to apply a continuous pressure to the toggle switch 30.

The seat valve 10 may be released from the rapid exhaust position by reversing the steps described above. The cam projection 113 may be unseated from within detent notch 70 by the occupant rotating the toggle switch 30 in opposite direction about the pivot pin 50. As the toggle switch 30 is returned to the center position, the first control tab 26a engages the peg 24 and slides it to the opposite end of the seat valve 10. As the slide member 34 slides across the upper surface 78 of the base 36, the cam projection 113 slides over the sloped surface of the detent notch 70 and down the cam portion 68. As the slide member 34 returns back to the closed position, the second spring 106 uncompresses to reseat the head portion 110 against the seal 114.

The previously described version of the present invention provides several advantages over pneumatic seat valves currently available in the art. The detent notch allows the seat occupant to rapidly exhaust air from within the pneumatic seat by simply toggling the slide member of the valve to engage a cam projection located therein. The detent notch selectively locks the pneumatic valve into the rapid exhaust position without requiring the occupant to apply a constant pressure to the valve to maintain it in an exhaust position. Furthermore, such a pneumatic valve does not require an external locking mechanism, such as a pin, to maintain the valve in a given position. Thus, a pneumatic valve formed in accordance with the present invention is simpler to operate than pneumatic valves currently available in the art.

From the foregoing description, it can be seen that a pneumatic valve formed in accordance with the present invention incorporates many novel features and offers significant advantages over currently available pneumatic seat valves. While the presently preferred embodiment of the invention has been illustrated and described, it is to be understood that within the scope of the appended claims, various changes can be made therein without departing from the spirit of the invention.

The embodiments of the invention in which an exclusive property or privilege is claimed are defined as follows:

1. A pneumatic valve, suitable for use in a pneumatic seat, the valve comprising:
   (a) a housing having an inlet port, a seat air inlet/outlet port, and at least a first exhaust port; and
   (b) a slide member supported by the housing for reciprocating movement relative to the housing to selectively control airflow therethrough, the slide member having an upper surface and a lower surface, the lower surface having a cammed portion to selectively and automatically permit rapid exhaustion of air from within the seat air inlet/outlet port, wherein the cammed portion further comprises a detent notch to selectively lock the slide member into a rapid exhaust position, wherein the seat air inlet/outlet port is in continuous fluid communication with the exhaust port to permit air to escape therethrough.

2. The pneumatic valve of claim 1, further comprising a spring-loaded valve slidably mounted within the seat air inlet/outlet port.

3. The pneumatic valve of claim 2, wherein the spring-loaded valve comprises an elongate poppet and a first spring, the poppet having an enlarged head located at one end and a cam projection at the other end, the poppet is slidably mounted within the seat air inlet/outlet port on the first spring to control airflow through the seat air inlet/outlet port.

4. The pneumatic valve of claim 3, wherein the first spring biases the poppet within the housing such that the head of the poppet is seated against the housing to prevent air from escaping therethrough.

5. The pneumatic valve of claim 4, wherein the detent notch of the slide member compresses the poppet against the first spring to unseat the poppet and permit air to pass through the seat air inlet/outlet port and out the exhaust port when the slide member is in the rapid exhaust position.

6. The pneumatic valve of claim 4, further comprising a second exhaust port located in the housing.

7. The pneumatic valve of claim 6, wherein the detent notch of the slide member compresses the poppet against the first spring to unseat the poppet and permit air to pass through the seat air inlet/outlet port and out the first and second exhaust ports when the slide member is in the rapid exhaust position.

8. The pneumatic valve of claim 5, wherein the detent notch is sized to receive the cam projection therein to selectively lock the slide member into the rapid exhaust position.

9. The pneumatic valve of claim 8, further comprising a second spring disposed within the lower surface of the slide member to bias the pneumatic valve into a closed position, wherein airflow through the seat inlet/outlet port is blocked by the head of the poppet and the slide member itself.

10. A pneumatic valve for use in a pneumatic seat of a vehicle, the pneumatic valve comprising:
    (a) a housing having an inlet port, a seat air inlet/outlet port, and at least a first exhaust port;
    (b) a slide member supported by the housing for reciprocating movement relative to the housing and selectively controlling airflow therethrough, the slide member having an upper surface and a lower surface; and
    (c) a locking member located on the lower surface of the slide member for rapidly exhausting air from within the seat by selectively locking the slide member into continuous fluid communication with the seat air inlet/outlet port and the exhaust port.

11. The pneumatic valve of claim 10, further comprising a spring-loaded valve slidably mounted within the seat air inlet/outlet port.

12. The pneumatic valve of claim 11, wherein the spring-loaded valve comprises an elongate poppet and a first spring, the poppet having an enlarged head located at one end and a cam projection at the other end, the poppet is slidably mounted within the seat air inlet/outlet port on the first spring to control airflow through the seat air inlet/outlet port.

13. The pneumatic valve of claim 12, wherein the first spring biases the poppet into a closed position, wherein airflow through the seat air inlet/outlet port is partially blocked by the head of the poppet.

14. The pneumatic valve of claim 13, wherein the locking member comprises a cammed portion and a detent notch, the detent notch being sized to receive the cam projection therein to selectively lock the slide member into continuous fluid communication with the seat air inlet/outlet port and the exhaust port to vent air from within the seat air inlet/outlet port.

15. The pneumatic valve of claim 14, further comprising a second exhaust port located in the housing.

16. The pneumatic valve of claim 15, wherein the detent notch of the slide member compresses the poppet against the first spring to unseat the poppet and permit air to pass through the seat air inlet/outlet port and out the first and second exhaust ports when the slide member is in the rapid exhaust position.

17. A pneumatic valve for use in a pneumatic seat of a vehicle, the pneumatic valve comprising:
    (a) an upper housing;
    (b) a lower housing slidably received within the upper housing, the lower housing having an upper surface and a lower surface, the lower surface defining an inlet port, a seat air inlet/outlet port, and two exhaust ports;
    (c) an elongate poppet slidably mounted within the seat air inlet/outlet port on a first spring to control airflow through the seat air inlet/outlet port, the poppet having an enlarged head located at one end and a cam projection located at the other end; and
    (d) a slide member supported on the upper surface of the lower housing for reciprocating movement relative the housing to selectively control airflow therethrough, the slide member having an upper surface and a lower surface, the lower surface having a cammed portion to selectively and automatically permit rapid exhaustion of air from the seat air inlet/outlet port.

18. The pneumatic valve of claim 17, wherein the cammed portion further comprises a detent notch to selectively lock the slide member into continuous fluid communication with the seat air inlet/outlet port and the exhaust ports to permit air to escape therethrough.

19. In a pneumatic valve for use in a vehicle with a pneumatic seat having at least one airbag, the valve having a housing with an inlet port, a seat air inlet/outlet port, and at least a first exhaust port, the valve further including a slide member supported by the housing for reciprocating movement relative to the housing to selectively control airflow therethrough, the slide member having an upper surface and a lower surface, the improvement comprising:

(a) locking member located on the lower surface of the slide member for rapidly exhausting air from within the airbag of the seat by locking the slide member into continuous fluid communication with the seat air inlet/outlet port and the exhaust port.

20. The improvement of claim 19, further comprising an elongate poppet and a first spring, the poppet having an enlarged head located at one end and a cam projection located at the other end, the poppet is slidably mounted within the seat air inlet/outlet port on the first spring to control airflow through the seat air inlet/outlet port.

21. The improvement of claim 20, wherein the first spring biases the poppet into a closed position, wherein airflow through the seat air inlet/outlet port is partially blocked by the head of the poppet.

22. The improvement of claim 21, wherein the locking member comprises a cammed portion and a detent notch, the detent notch being sized to receive the cam projection therein to selectively lock the slide member into continuous fluid communication with the seat air inlet/outlet port and the exhaust port to permit air from within the airbag to escape therethrough.

* * * * *